United States Patent [19]

Iguma et al.

[11] Patent Number: 4,702,555
[45] Date of Patent: Oct. 27, 1987

[54] OPTICAL SYSTEM DRIVE FOR OPTICAL RECORDING/REPRODUCING APPARATUS

[75] Inventors: Akira Iguma; Tadashi Okuda; Kouichi Ieki, all of Toyokawa; Toshio Sasamoto, Fussa, all of Japan

[73] Assignee: Hitachi, Ltd., Tokyo, Japan

[21] Appl. No.: 731,947

[22] Filed: May 8, 1985

[30] Foreign Application Priority Data

May 14, 1984 [JP] Japan ................................ 59-94453

[51] Int. Cl.$^4$ .............................................. G02B 7/04
[52] U.S. Cl. ..................................... 350/247; 369/45; 336/198
[58] Field of Search .................. 350/255, 247; 369/44, 369/45; 29/603; 323/355, 362; 336/198, 208; 242/118.4, 118.41

[56] References Cited

U.S. PATENT DOCUMENTS

| 3,371,302 | 2/1968 | Mas ....................... 336/198 |
| 3,605,055 | 9/1971 | Grady ..................... 242/118.41 |
| 3,675,175 | 7/1972 | Dutton . | |
| 3,750,073 | 7/1973 | Okano . | |
| 3,939,450 | 2/1976 | Donnelly ................. 336/208 |
| 4,315,232 | 2/1982 | Spoldi et al. ............. 336/198 |
| 4,387,863 | 6/1983 | Edmonston et al. ...... 242/118.4 |
| 4,449,111 | 5/1984 | Nakajima ................. 336/198 |
| 4,557,564 | 12/1985 | Van Rosmalen .......... 350/255 |

FOREIGN PATENT DOCUMENTS 60-40535 3/1985 Japan .
2191902 8/1982 United Kingdom .

Primary Examiner—John K. Corbin
Assistant Examiner—Loha Ben
Attorney, Agent, or Firm—Antonelli, Terry & Wands

[57] ABSTRACT

An objective lens drive unit including a bobbin wound with driving coils and having mounted thereon a lens for transmitting a light beam which is controlled by drive currents flowing through the coils is used for controlling the focussing/tracking of the light beam on a recording medium. The bobbin comprises a hole mounting the objective lens, first recesses formed in opposed side walls of the bobbin substantially in parallel with the mounting hole for accommodating one of the coils wound substantially perpendicularly to the mounting hole, notches formed in the first recesses parallel with the mounting hole for accommodating passing terminal end/start portions of the coil, and second recesses formed along two opposed sides of the opposite side walls for accommodating the other coils wound so as to intersect each other at the other pair of opposite side walls of the bobbin. The windings are retained by projections so that a continuous winding on the recesses can be completed, and thickened portions on the outer walls of the bobbin are bonded to the windings to increase the dynamic rigidity of the bobbin vibrating at frequencies of up to 20 kHz.

10 Claims, 15 Drawing Figures

F I G. 2d
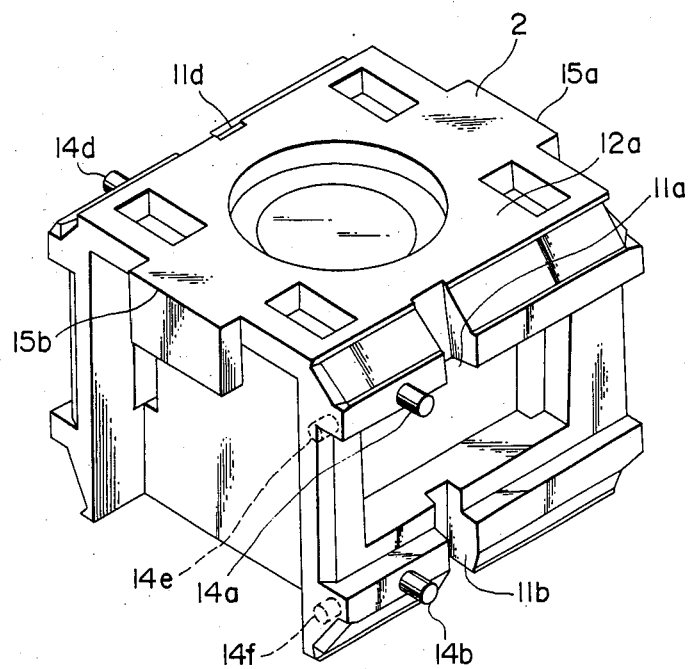

DRIVING FORCE IN TRACKING DIRECTION: $F_{TR}=F_{1X}+F_{2X}$

OPTICAL SYSTEM DRIVE FOR OPTICAL RECORDING/REPRODUCING APPARATUS

CROSS-REFERENCE TO RELATED APPLICATIONS

The present application relates to commonly assigned U.S. patent application Ser. No. 666,747 and European Patent Application No. 84113115.4, claiming priority of Japanese Patent Application No. 202600/1983.

BACKGROUND OF THE INVENTION

The present invention relates generally to an optical system driving apparatus for driving a driven unit including an objective lens in a direction corresponding to the optical axis of the objective as well as in a direction perpendicular to the optical axis, for optically recording and/or reading information or data from a recording medium with the aid of a light beam transmitted through the objective.

In previously proposed optical recording/reproducing apparatus using a laser light beam, the laser light beam is focussed in a minute spot by an objective lens system for the signal recording and/or reading (detecting). For accomplishing the signal recording and/or detection (reading) with desired accuracy, it is necessary not only to provide a focussing control for forming the light spot focussed on an information recording medium in consideration of roughness or physical non-uniformity and vibration of the information recording medium but also a tracking control for causing the focussed light spot to constantly trace the correct signal track without fail. Further, to deal with errors brought about in the time base due to non-uniformity in rotation of the information recording carrier, it is necessary to provide an error detection system combined with means for controlling an actuator adapted to drive the objective lens system so that the error can be cancelled.

Previously for the error correcting control mentioned above, there has been known a driving mechanism in which the objective lens is displaced in the direction of the optical axis thereof while mirrors located on the optical axis leading to the objective and having respective rotation axes extending orthogonally to each other are rotated by using a so-called voice coil, to thereby cause the optical path to be shifted in two directions perpendicular to the optical axis, whereby position of the focussed spot of laser light beam is controlled in the three independent directions. The driving system of this structure requires a heavy objective lens having a large angle of view, resulting in that the overall size of the driven unit is remarkably increased, to a disadvantage.

As an approach to solve the above problem, there has been proposed an arrangement in which the optical system including a light-weight objective having a small angle of view is supported by means of resilient supporting members such as leaf springs so that the optical system can be vibrated in the direction corresponding to the optical axis and the direction perpendicular thereto by utilizing electrical signals. For driving electrically the objective lens two-dimensionally, it is possible to adopt a driving system in which electromagnetic means is employed, a driving system implemented by resorting to the use of the voice-coil means and a driving system in which piezo-electric elements are used. In any system as adapted, it is necessary to implement the driven unit in a reduced size and weight in order to assure an improved response in the focussing and tracking performances. In this connection, it has been proposed to provide a structure known heretofore in which a driven unit is equipped with a coil while a magnetic circuit is employed for the driving unit for implementing the tracking function as well as the focussing function. A disadvantage of this proposed structure resides in the fact that manufacturing cost are increased because of severe requirement imposed on the dimensional accuracy of the coil. Further, this proposed structure is not suited for mass-production fabrication. Besides, in case the structural rigidity or stiffness of the coil assembly is low, it is very difficult to increase the upper resonant frequency ($f_h$) of the driven unit inclusive of the coil beyond the frequency band of a servo system, giving rise to a problem that the focussing and tracking operations can not be carried out with a desired accuracy.

SUMMARY OF THE INVENTION

An object of the present invention is to provide an objective lens drive apparatus for an optical information recording/reproducing system, which apparatus awards the drawbacks described above and is excellently suited for the manufacture on a mass-production basis while assuring improved performance.

Another object of the present invention is to provide an objective lens drive unit equipped with convenient means for continuously winding a tracking coil and a focussing coil on a bobbin of a reduced size.

Still another object of the present invention is to provide an objective lens drive unit which has an increased dynamic rigidity and can exhibit a high responsive amplitude characteristic even in a high frequency region.

According to the invention a bobbin is provided with notches and projections such as pins for facilitating the winding of the driving coils. According to another aspect of the invention, reinforcing means for reinforcing the driving coil are provided as an integral part of the bobbin and are bonded to the driving coil, to thereby increase the high resonance frequency of the driven unit and widen the frequency response range thereof.

BRIEF DESCRIPTION OF THE DRAWINGS

The above and other objects, features and advantages of the invention will be more apparent upon consideration of the following description taken in conjunction with the accompanying drawings, in which:

FIG. 2d is a perspective view showing a structure of the bobbin according to another embodiment of the invention;

DETAILED DESCRIPTION

Figure 1A:
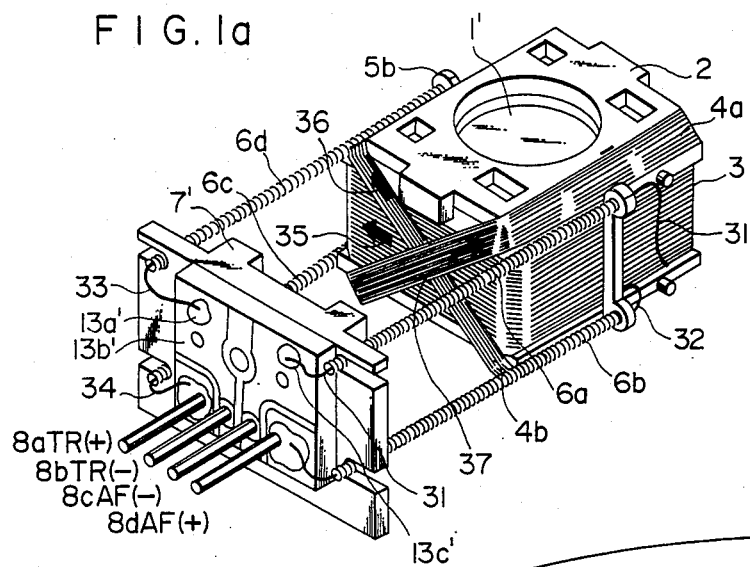
FIG. 1a is a pictorial prespective view illustrating a manner in which coils are wound on a bobbin according to an embodiment of the invention.
Figure 1B:
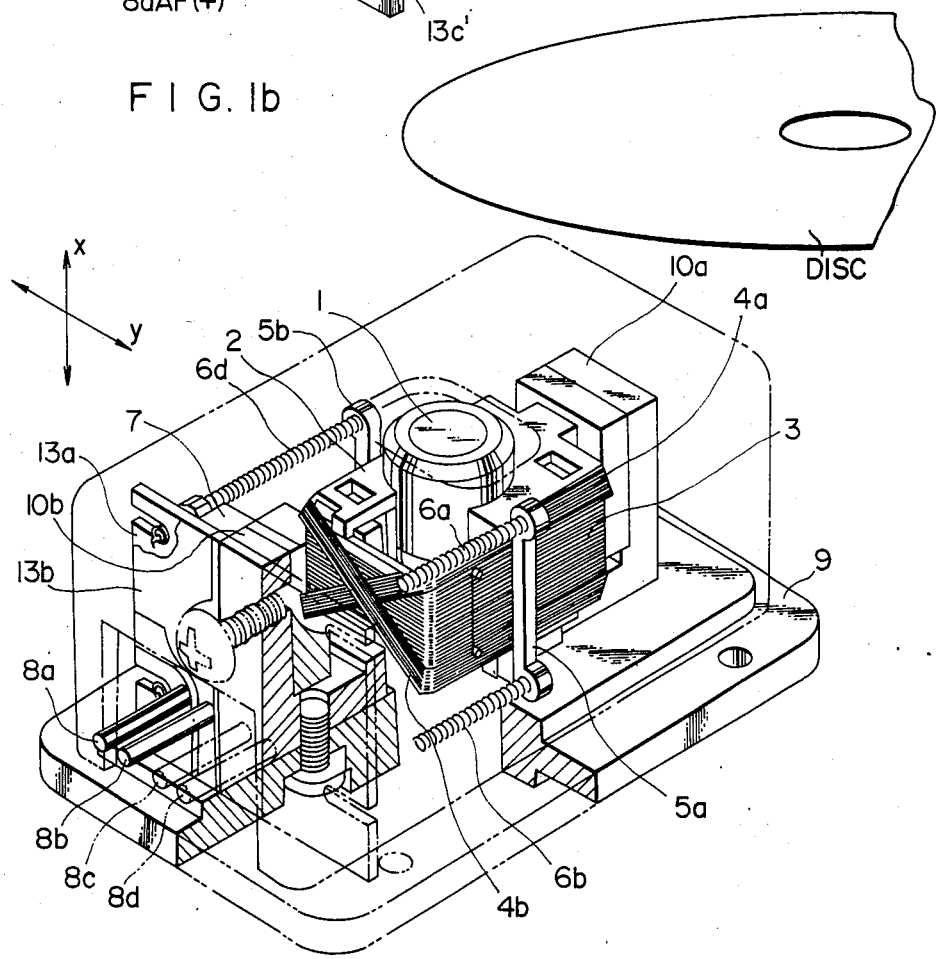
FIG. 1b is a partially broken perspective view showing an objective lens drive unit incorporating the bobbin wound with the coils according to the teaching of the invention.

First referring to FIG. 1b, an objective lens 1 is mounted on a bobbin 2 around which a focussing coil 3 and a tracking coil assembly including coils 4a and 4b are wound. Spring holders 5a and 5b are fixedly mounted on the bobbin 2 for securing suspension springs 6a to 6d at respective one ends thereof. The other ends of these suspension springs 6a to 6d are mounted on a stationary frame member 7. In FIG. 1b each of the four suspension springs 6a and 6d is constituted by a coil spring formed by winding a phosphor bronze wire of 0.1 mm in diameter closely. It should be noted that lead-out wires (terminal wire) of the focussing and tracking coils are inserted coaxially through these suspension springs 6a to 6d. The exposed end portions of the lead-out wires are, respectively, connected to terminal pins 8a to 8d for external connection through conductor patterns 13b deposited on the stationary frame 7 by soldering as shown at 13a.

Magnetic circuit components 10a and 10b are fixedly mounted on a base plate 8 so as to define a magnetic gap therebetween in which the focussing coil 3 and the tracking coil assembly (4a; 4b) are disposed. Accordingly, by supplying electric currents to the terminal pins 8a to 8d, the driven unit composed of the objective lens 1, the bobbin 2, the focussing coil 3 and the tracking coils 4a; 4b can be driven in the focussing direction (x) as well as in the tracking direction (y).

As shown in FIG. 1a, wherein the driven unit is separated from the driving structure, the one lead-out wire 31 of the focussing coil 3 extends coaxially through the suspension coil spring 6a and is soldered to the conductor pattern 7' at 13c' and hence to the connecting terminal pin 8c. On the other hand, the other end wire 32 of the focussing coil 3 is led outwardly through the suspension coil spring 6b to be electrically connected to the terminal pin 8d. A focussing drive current can be supplied to the focussing coil 3 as indicated by an arrow 35.

The tracking drive coil is composed of a pair of coil portions 4a and 4b wound on the bobbin 2 in a manner intersecting each other wherein both end portions 33 and 34 of the tracking coil extend through the suspension coil springs 6c and 6d, respectively, to be electrically connected to the terminal pins 8a and 8b to thereby allow a tracking drive current to flow through the tracking coil portions 4a and 4b as indicated by arrows 36 and 37.

Figure 4:
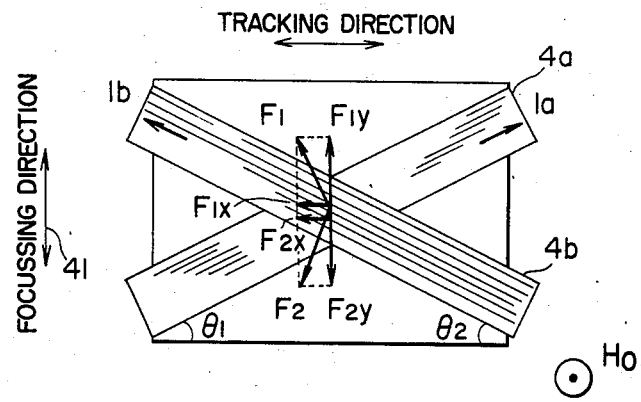
FIG. 4 is a view for illustrating driving forces applied to the bobbin wound with the coils.

Referring to FIG. 4, the magnetic circuit 10a constantly generates a static magnetic field $H_o$ in the direction perpendicular to the plane of the drawing. On the other hand, the magnetic circuit 10b generates a static magnetic field $H_o'$ in the direction opposite to that of the magnetic field $H_o$. Consequently, a driving force is applied to the driven unit in the focussing direction indicated by an arrow 41 under energization of the focussing coil 3 by the AC focussing drive current 35 (FIG. 1a).

The tracking drive currents $I_a$ and $I_b$ flowing through the tracking coils 4a and 4b are always of a same magnitude. By selecting the winding angles $\theta_1$ and $\theta_2$ as well as the numbers of turns of the tracking coil portions 4a and 4b equal to each other, magnitudes of forces $F_1$ and $F_2$ applied to the coils 4a and 4b in the static magnetic field $H_o$ are equal to each other. Components $F_{1y}$ and $F_{2y}$ of the forces $F_1$ and $F_2$ in the vertical direction y are of opposite direction.

Accordingly, these vertical components $F_{1y}$ and $F_{2y}$ cancel each other, whereby a sum of the force components $F_{1x}$ and $F_{2x}$ of the tracking direction is effective as the tracking drive force $F_{TR} = F_{1x} + F_{2x}$.

TABLE 1

| (unit mm) | | | | | | | | |
|---|---|---|---|---|---|---|---|---|
| L 11 | 13.1 | L 21 | 1.55 | L 31 | 1.0 | L 41 | 3.5 | L 51 6.4 |
| 12 | 11.4 | 22 | 5.0 | 32 | 0.9 | 42 | 2.3 | 52 4.8 |
| 13 | 9.6 | | | | | 43 | 0.8 | |
| 14 | 11.5 | | | | | | | |

Figure 1C:
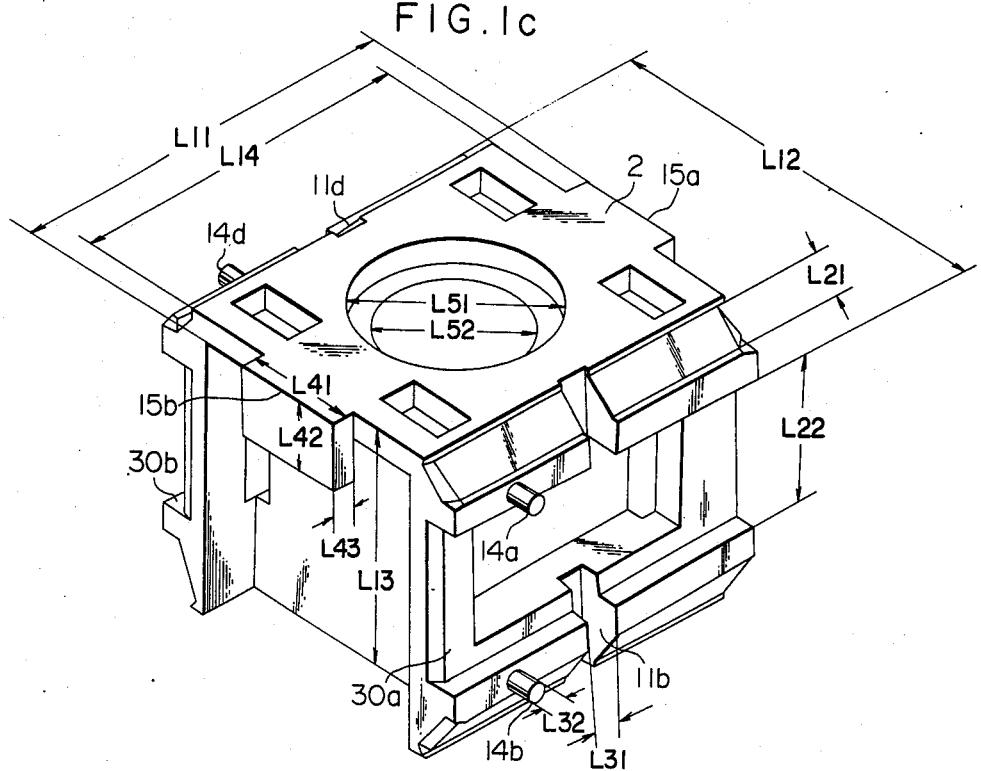
FIG. 1c is a perspective view for illustrating dimensional factors of the bobbin.

FIG. 1c and Table 1 show dimensions of the bobbin on which insulated conductors of for example 0.8 mm in diameter, are wound to form the focussing and tracking coils. The types of materials of the tracking coil and focussing coil conductors may be same or different in dependence upon the magnitudes of the tracking drive current and the focussing drive current. The structure and various dimensions of the bobbin will be self-explanatory from FIG. 1c and Table 1. They are, however, only for the purpose of exemplary illustration and should never be interpreted in any restrictive sense.

Figure 3A:
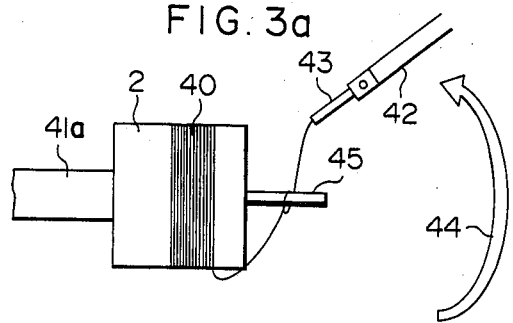
FIGS. 3a to 3c are views for illustrating methods of winding coils according to another embodiment of the invention.
Figure 3B:
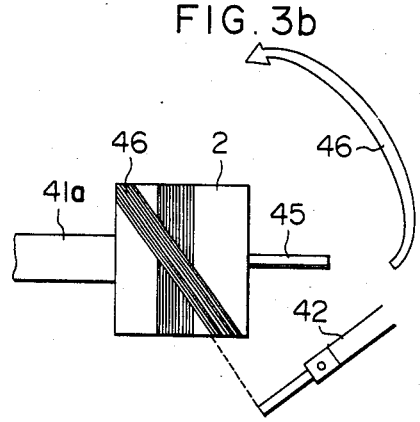
Figure 3C:
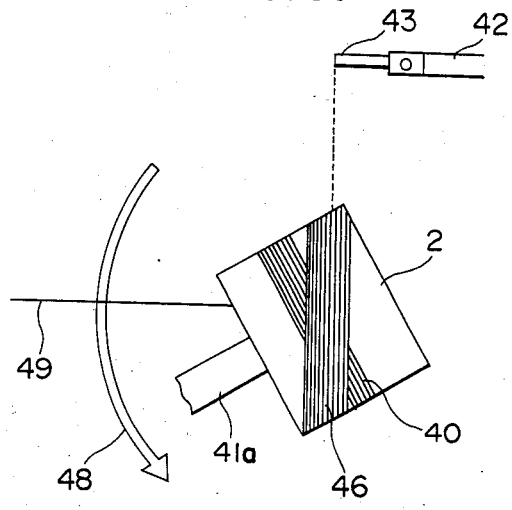

FIGS. 3a to 3c are views for illustrating a flyer winding method and a spindle winding method which may be adopted in winding the coils on the bobbin. Referring to FIG. 3a, a jig 41a is inserted and fixed in a hole 1' destined for mounting therein the objective lens. An arm 42 having a wire dispensing nozzle 43 for dispensing the wire is rotated in the direction indicated by an arrow 44 to wind the coil wire around the bobbin 2. At the end of the winding, the end portion of the coil wire is wound a few turns on a shaft 45 extending from the free end of the jig 41, and the arm 42 is displaced to a position for winding the tracking coil 46 at which the arm 42 is revolved about the bobbin 2 in a direction differing from the direction 44 as indicated by an arrow 46 while the coil wire is being dispensed from the wire nozzle 43, to thereby wind the tracking coil 46.

The possibility of forming the two types of coils in the continuous manner as mentioned above is one of the important factors for determining the possibility of manufacturing the objective drive unit on the mass-production basis.

Referring to FIG. 3c, there is illustrated another method according to which the winding of the tracking coil 46 on the bobbin 2 is carried out by revolving the jig 41a about a spindle shaft 49 in the direction 48 in place of rotating the arm 42. The arm 42 is stationarily located at the illustrated position and dispenses the coil conductor or wire through the nozzle 43.

The coils may be wound on the bobbin by resorting to any one of the methods illustrated in FIGS. 3a to 3c. Although the winding can be manually carried out, it is of course preferable to perform the winding operation in a predetermined sequence by using a wire winding robot having the wire dispensing arm in order to increase the yield of fabrication of the drive unit assembled on the bobbin of a reduced size and structure shown in FIG. 1c.

Figure 5:
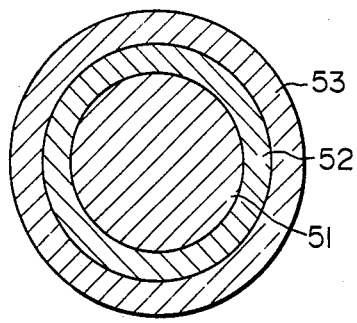
FIG. 5 is a sectional view of a conductor for the coil.

Referring to FIG. 5, the conductor or wire to be wound is composed of a center conductor or copper wire 51, an insulation film 52 coated around the wire 51 and a resolvable film 53 applied over the peripheral surface of the insulation film 52. Provided at the tip of the nozzle 43 is means (not shown) which is adapted to supply alcohol onto the peripheral surface of the coil being wound on the bobbin 2 for resolving the film 53 and wetting the peripheral surface of the wire of the adjacent turn wound already on the bobbin. Hot air is blown against the bobbin to vaporize alcohol. When the resolved film 53 is thus again solidified, the adjacent turns of the wound wire are set to the mutually bonded state. The film 53 may be formed of polyurethane or a polyurethane material impregnated with thermosettable epoxy resin. This type of the wire is known as self-bondable wire. By using the wire of this type for forming the coils wound around the bobbin, the dynamic rigidity can be increased, as will be described hereinafter.

Figure 2A:
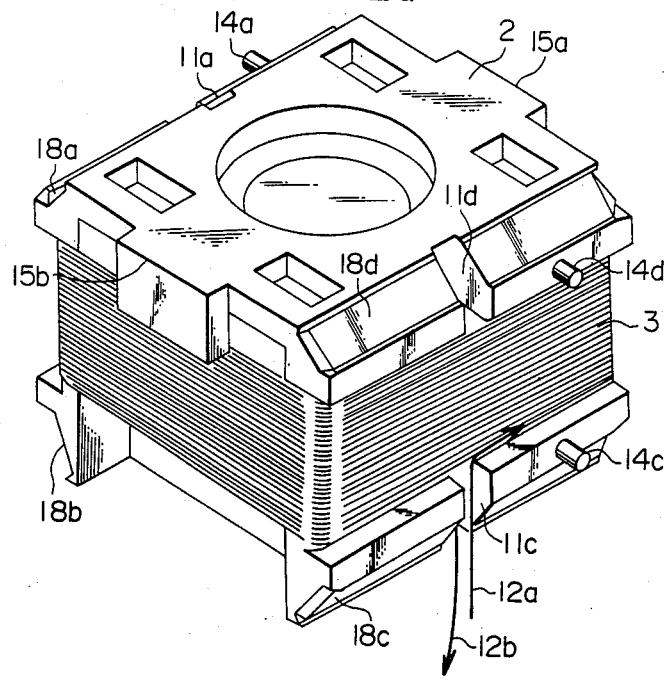
FIGS. 2a to 2c are views for illustrating a method of winding the driving coils.
Figure 2B:
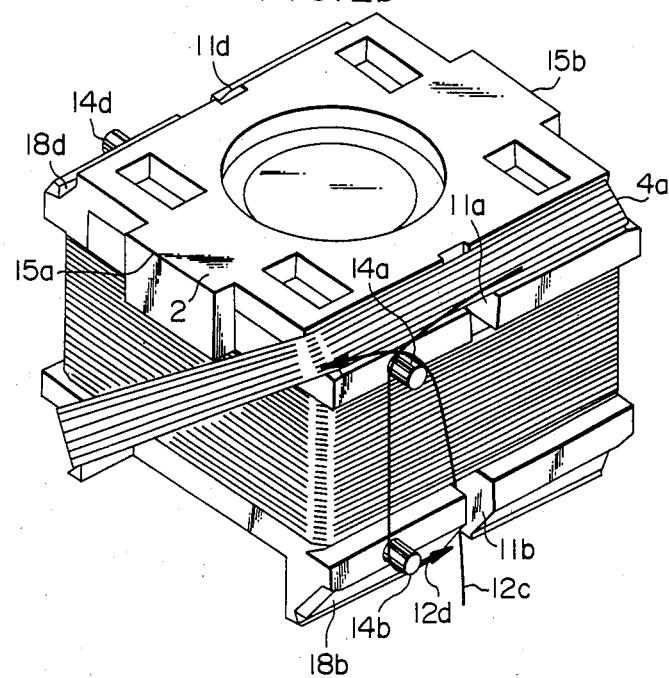
Figure 2C:
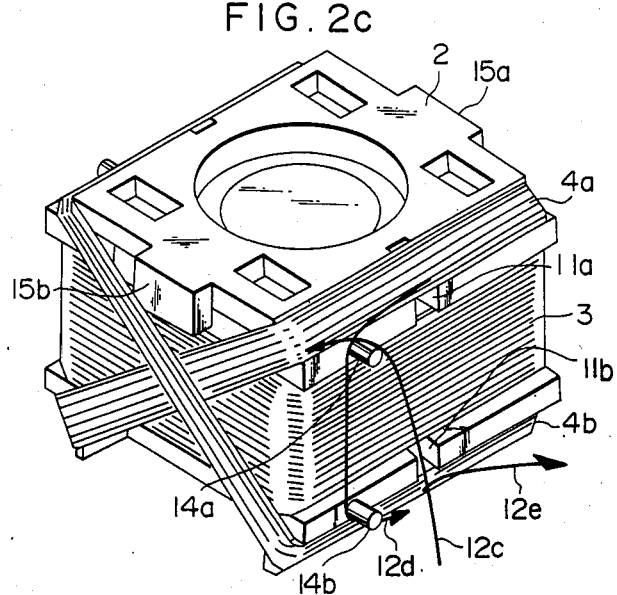

FIGS. 2a to 2c are perspective views for illustrating sequential processes for winding the focussing coil 3 and the tracking coils 4a; 4b on the bobbin 2. Referring first to FIG. 2a, a starting end portion 12a of the wire for forming the focussing coil is retained in a notch 11c from the underside thereof. After the wire has been wound around the bobbin in an even number of superposed layer to thereby from the focussing coil, the terminal end portion 12b of the wire is retained in the notch 11c and led out on the underside of the bobbin 2. In case an odd number of the winding layers are formed to serve as the focussing coil 3, the terminal end portion 12b of the wire is retained in a notch 11d and led out from the top side of the bobbin.

Subsequently, the tracking coil can be wound by retaining the starting end portion of the wire in the notch 11d. In that case, there is no danger of the coil end portions 12a and 12b retained in the notch 11c being interlaid in the tracking coil. Referring to FIG. 2b which shows the bobbin in a disposition rotated about 180° relative to the state illustrated in FIG. 2a, the starting end portion 12c of the tracking coil is first retained at a pin 14a and the wire is wound slant around the bobbin within recess or grooves 18a and 18c (FIG. 2a) provided at diametrically opposite corners of the bobbin 2. After the tracking coil 4a has been completely wound, the wire is spanned across the pins 14a and 14b and wound within other pair of grooves 18b and 18d (FIG. 2a) starting from the spanned end portion 12d. It will be understood that by virtue of the posts 14a and 14d and the notches 11a to 11d, the tracking coils 4a and 4b can be continuously wound without relaying the wire in the course of winding, which means that the productivity or yield can be enhanced.

Figure 6:
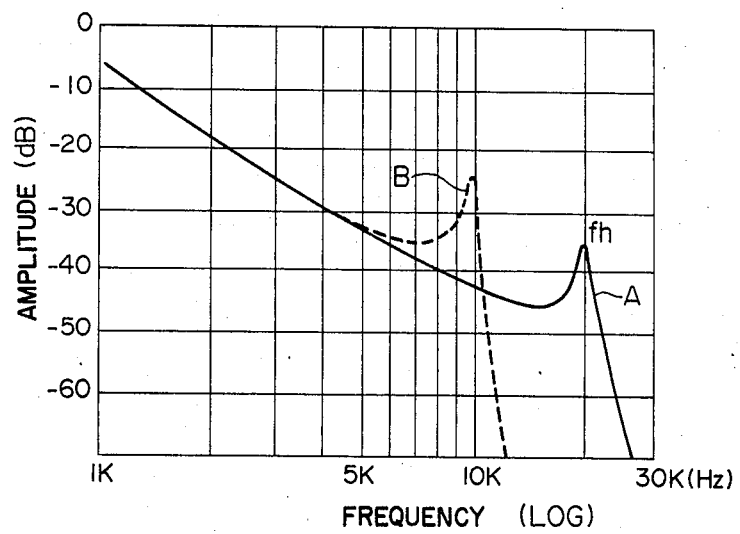
FIG. 6 is a view showing graphically frequency response characteristics.

Reinforcing portions 15a and 15b are provided at positions to be bonded to the focussing coil 3 to prevent misalignment or deviation of the wound wire of the coil 3. By virtue of this bonding and the use of the self-bondable wire described hereinbefore, the unwanted dislodgement of the coil wire is prevented, whereby the rigidity of the driven unit can be increased. As the result, the high resonance frequency of the driven unit is increased, and thus the frequency response region can be broadened as mentioned below. FIG. 6 illustrated graphically the frequency response characteristics of the driven units both of which include the focussing and tracking coils formed of the self-bondable wire, wherein one of the units is provided with the reinforcing portions while the other is not. More specifically, a curve A represents the frequency response characteristic of the driven unit provided with the reinforcing portions 15a, 15b and a curve B is for the driven unit in which the reinforcing portions 15a, 15b are absent. Spike-like peaks of the curves A and B correspond to the locations of the upper resonant frequencies $f_h$. It will be seen from FIG. 6 that the frequency response range of the driven unit provided with the reinforcing portions 15a, 15b is widened. In the case of the illustrated embodiment, the bobbin is formed of polycarbonate admixed with 10 to 30 wt. % of carbon fibers or glass fibers for the purpose of reducing the weight of the bobbin 2 and increasing the rigidity thereof.

Figure 7:
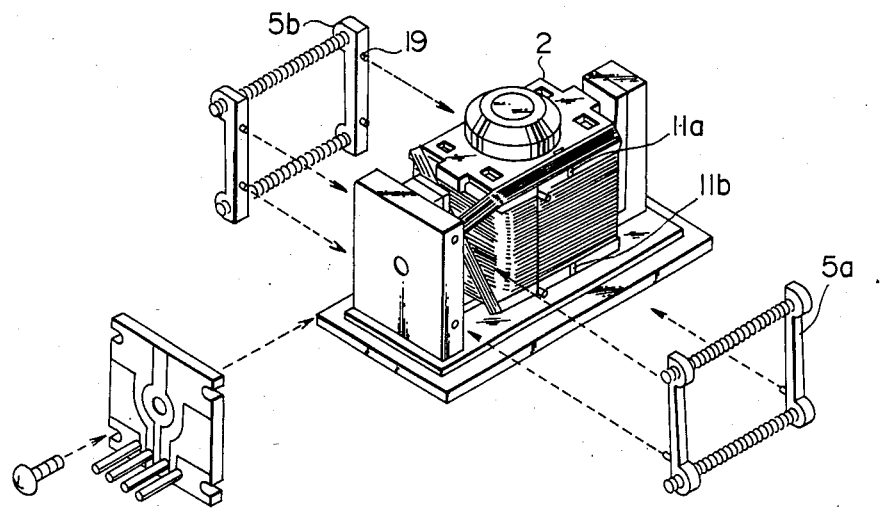
FIG. 7 is a partially exploded perspective view showing a method of assembling an objective lens drive unit according to an embodiment of the invention.

FIG. 7 is a perspective view showing a method of assembling the driven unit according to an embodiment of the invention. The notches 11a to 11d can be used for mounting the suspension holders 5a and 5b on the bobbin in addition to the wire retaining function described hereinbefore. To this end, the notch may be formed to flare outwardly for receiving cylindrical guide pins 19 mounted on the holders 5a and 5b, whereby the process for inserting the pins into the notches 11a to 11d of the bobbin 2 can be facilitated.

Figure 8:
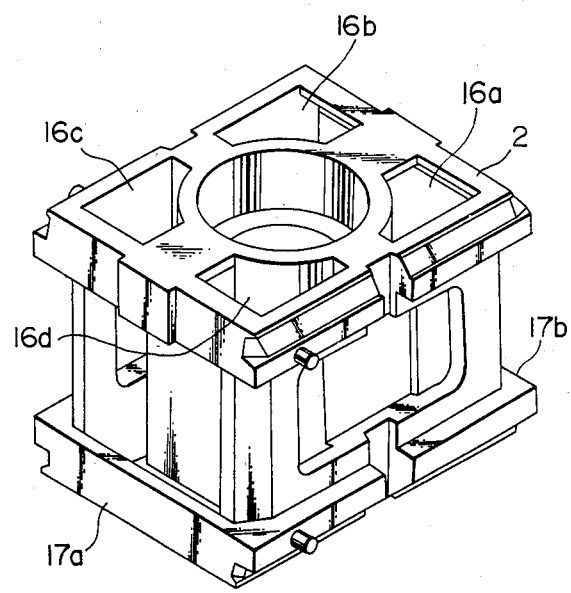
FIG. 8 is an exaggerated perspective view of the bobbin according to still another embodiment of the invention.

FIG. 8 shows a bobbin structure according to another embodiment of the present invention. Hollow portions 16a to 16d of the bobbin 2 are enlarged as compared with the one shown in FIGS. 1c and 2d for reducing the weight of the bobbin. With the bobbin structure shown in FIG. 8, the current-amplitude characteristic (i.e. the sensitivity) of the driven unit is increased. Further, in order to increase the rigidity or stiffness of the bobbin 2 in the tracking direction, bridging portions 17a and 17b are provided and bonded to the coil by a bonding agent, whereby the resonance frequency $f_h$ can be increased, resulting in an improvement of the frequency response characteristic.

The light beam passing through the objective mounted on the bobbin 2 according to the preferred embodiment of the invention may be a laser beam modulated in amplitude for writing or recording data on a recording medium. Alternatively, the recording medium may be irradiated with a light beam of a predetermined intensity, wherein the light beam transmitted or reflected through or from the recording medium and modulated with the optical characteristics of the recording medium such as difference in reflecting index due to roughness (pit array) or transition of the crystal-amorphous phase may be picked up through the objective lens, needless to say. Besides, in the case of an optomagnetical disc, tracks on a rotating disc are irradiated with a light beam of a predetermined intensity through the objective lens, wherein writing of data may be realized by applying magnetic field of a requisite direction to the disc.

Accordingly, the bobbin structure according to the invention can be employed for mounting a lens system for passing a light beam which is to be directed to a predetermined position on a recording medium employed in a compact disc, an optical disc and an optomagnetic disc apparatus.

FIG. 2d shows a bobbin structure according to another embodiment of the invention, in which the notches 11a to 11d are formed at positions shifted from the center of the individual sides of the bobbin toward the pins 14a to 14d, respectively. With this bobbin structure, the wire retaining action intervening between the windings of the focussing coil and the tracking coils can be further improved. In order that an assembling robot can perform positively the winding of the coils without interruption, the improvement of the wire retaining action is an important factor for attaining a high quality of the objective driving apparatus, high yield and reduction in the manufacturing cost because the loose wire section will involve a serious defect in the finished product.

We claim:

1. A bobbin wound with driving coils and having mounted thereon a lens for transmitting a light beam, wherein said light beam is controlled by drive currents flowing through said coils, comprising:
   (a) a mounting hole for mounting said lens and passing therethrough said light beam transmitting through said lens;
   (b) first recesses formed in a pair of opposite side faces of said bobbin, respectively, substantially in parallel with the axis of said mounting hole for accomodating therein one of said coils which is wound substantially perpendicularly to the axis of said mounting hole;
   (c) notches formed in said first recesses in parallel with the axis of said mounting hole for passing therethrough terminal end/start end portions of said one of said coils; and
   (d) second recesses formed along two opposite sides of said opposite side faces, respectively, for accommodating therein the other coils which are wound so as to intersect each other at other pair of opposite side faces of said bobbin, respectively.

2. A bobbin according to claim 1, wherein said notches having a substantially same width as that of projections of members to be mounted on said bobbin, each of said notches having an outwardly flaring opening so as to serve to guide insertion of said projections into said notches.

3. A bobbin according to claim 1, further including at least two retaining projections used as relaying means in the course of winding said coils in said first and second recesses in a continuous manner.

4. A bobbin according to claim 1, further including thickened portions formed in said other pair of opposite side face so as to be in contact with said one of said coils.

5. A bobbin according to claim 1, wherein said bobbin is formed of a moldable material admixed with 10 to 30 wt. % of carbon fiber or glass fiber.

6. A method of manufacturing an objective lens drive unit for driving an objective lens in a focussing direction as well as in the direction orthogonal to said focussing direction, said objective lens transmitting therethrough a light beam for optically recording/reproducing information on/from a recording medium, comprising:
   (a) forming notches in top and bottom sides of each of a pair of opposite side faces of a bobbin on which coils for driving said objective lens are wound,
   (b) inserting lead portions corresponding to a starting end portion and a terminal end portion of a first coil in said notches; and
   (c) winding on said first coil second and third coils.

7. A method of manufacturing an objective lens drive unit according to claim 6, wherein at least some of said notches are used as guide holes for mounting other members on said bobbin.

8. A method of manufacturing an objective lens drive unit according to claim 6, wherein at least two projections are formed in said bobbin, said projections being used as guide for winding said second coil and said third coil continuously from said first coil.

9. A method of manufacturing an objective lens drive unit according to claim 6, wherein thickened portions are formed in said bobbin so as to be bonded to said first coil or said second coil or third coil at portions intervening a magnetic circuit of said drive unit.

10. A method of manufacturing an objective lens drive unit according to claim 6, wherein said bobbin is formed of a moldable material admixed with 10 to 30 wt. % of carbon fiber or glass fiber.

* * * * *